United States Patent
Carter, Jr.

(10) Patent No.: US 6,435,453 B1
(45) Date of Patent: Aug. 20, 2002

(54) HIGH SPEED ROTOR AIRCRAFT

(75) Inventor: Jay W. Carter, Jr., Wichita Falls, TX (US)

(73) Assignee: Cartercopters, L.L.C., Wichita Falls, TX (US)

(*) Notice: Subject to any disclaimer, the term of this patent is extended or adjusted under 35 U.S.C. 154(b) by 0 days.

(21) Appl. No.: 09/641,364

(22) Filed: Aug. 18, 2000

Related U.S. Application Data

(60) Provisional application No. 60/149,965, filed on Aug. 20, 1999, and provisional application No. 60/207,025, filed on May 25, 2000.

(51) Int. Cl.$^7$ ............................................. B64C 27/02
(52) U.S. Cl. ..................... 244/8; 244/25 R; 244/17.11
(58) Field of Search ...................... 244/4 R, 6, 7 R, 244/17.11, 8

(56) References Cited

U.S. PATENT DOCUMENTS

| | | | | |
|---|---|---|---|---|
| 3,155,341 A | | 11/1964 | Girard | ........................... 244/7 |
| 3,176,774 A | * | 4/1965 | Krinsky | |
| 3,558,082 A | * | 1/1971 | Bennie | |
| 5,098,033 A | * | 3/1992 | Haseloh et al. | |
| 5,544,844 A | * | 8/1996 | Groen et al. | |
| 5,727,754 A | | 3/1998 | Carter, Jr. | ...................... 244/8 |
| 5,853,145 A | | 12/1998 | Carter, Jr. | ................ 244/17.25 |
| 6,024,325 A | | 2/2000 | Carter, Jr. | ................... 244/7.25 |

FOREIGN PATENT DOCUMENTS

WO    WO 94/00343    * 1/1994    ............. 244/17.11

* cited by examiner

*Primary Examiner*—Charles T. Jordan
*Assistant Examiner*—T. Dinh
(74) *Attorney, Agent, or Firm*—Bracewell & Patterson, L.L.P.

(57) ABSTRACT

An improved method of operating rotorcraft capable of achieving high speeds such that stability is maintained as the craft speed exceeds 0.75 times the rotor tip speed. These high speeds are achieved by varying collective pitch, including to negative values, to maintain acceptable levels of flapping at high aircraft forward speeds and low rotor rotation rates, or adjusting or maintaining the rotor rotation rate by automatically controlling the tilt of the rotor disk relative to the airstream or aircraft, or a combination of these techniques. More specifically, by utilizing these techniques the forward aircraft speeds can be high enough, and the rotor rotation rates low enough, that an advance ratio, Mu, greater than 0.75 can be achieved while maintaining rotor stability.

7 Claims, 6 Drawing Sheets

HIGH SPEED ROTOR AIRCRAFT

This application claims the benefit of provisional application No. 60/149,965 filed Aug. 20, 1999 and No. 60/207,025 filed May 25, 2000.

FIELD OF INVENTION

This invention relates to novel methods and apparatus for improving the high speed performance of rotary wing aircraft.

DESCRIPTION OF THE PRIOR ART

There are two types of heavier than air aircraft that achieve lift by movement through the air:
 (1) The airplane, which has stationary wings that create lift when propelled through the air by a thrust mechanism such as a propeller or jet engine, and
 (2) The rotorcraft or rotary wing aircraft in which blades rotate to describe a disc above the aircraft to create lift.

There are three types of rotorcraft that utilize a blade to provide lift:
 (1) The helicopter, in which the rotor blade provides vertical thrust and, because the rotor disc can be tilted on a supporting and rotating vertical mast, a horizontal thrust component.
 (2) The autogyro, in which lift is provided by a rotary wing and forward thrust provided by a propeller or a jet. Autogyration is achieved by tilting the rotor disc back relative to the airflow so that some air flows up between the blades and through the rotor disc rather than down through the rotor disc as in a helicopter. As the air flows up through the rotor disc, the rotor is driven much like a windmill is driven by the wind.
 (3) The gyroplane, described in U.S. Pat. No. 5,727,754, in which a rotor is used for vertical and slow speed flight, but at high speed cruise the rotor is unloaded (provides almost no lift) and the wing provides nearly all the lift.

Juan de la Cierva in Spain invented the autogyro in 1923. Successful autogyros were produced in England and by several companies in the U. S., with Pitcairn being the most notable manufacturer. In the 1930's autgyro technologywas rapidly advancing and its safety and utility were being demonstrated and accepted. Mail carrying autogyros operated from the top of the Philadelphia Post Office. Four- and five-passenger autogyros were being produced as well as smaller ones. Pitcairn alone developed and manufactured 14 models between 1930 and 1940. These aircraft had performance equaling contemporary airplanes with maximum speeds up to 150 mph.

The quest for faster rotorcraft has been ongoing ever since. One basic problem is that a rotor's lift is limited by the lift that can be produced by the retreating blade, since the aircraft will roll if the total lift moments on the advancing blade and retreating blade are not equal. At high aircraft forward speeds, the retreating blade tends to stall and lose lift, because the rotor RPM cannot be increased without the advancing blade tip going faster than the speed of sound. Because of this problem, the ratio of aircraft forward speed to rotor tip speed, known as Mu, is limited to about 0.5 in helicopters and autogyros.

To achieve the highest speed flight with a gyroplane or helicopter it is necessary to reduce rotor lift during horizontal flight, to reduce the problems with retreating blade stall. This goal is disclosed in U.S. Pat. No. 3,155,341, issued to The Ryan Aeronautical Company, Nov. 3, 1964. The English Frairey Rotodyne, which had a wing and tip jet autorotating rotor, used for take off and landing, set a closed course speed record for rotorcraft of 191 mph in 1959. The Russian KAMOV KA-22 broke this speed record in 1961 with a speed of 221 mph. The current record is approximately 250 MPH. All these aircraft reduce lift on the rotor by having some lift provided by a wing or by providing auxiliary thrust with a separate engine so that the rotor provides lift but no thrust. However, none of them exceed a Mu of 0.5.

The drag of a rotor blade increases with the cube of the rotation rate. Therefore, it is a great advantage if the rotation rate can be reduced. The ratio of aircraft forward speed to rotor tip speed, known as Mu, must be increased as much as possible, probably over 1.0. The challenge, then, is to maintain autorotation and rotor stability at high Mu. This is the subject of this invention.

BRIEF SUMMARY OF THE INVENTION

It is the general object of the invention to provide an improved method of operating rotorcraft capable of achieving high speeds.

In general, this object is achieved by varying collective pitch, including to negative values, to maintain acceptable levels of flapping at high aircraft forward speeds and low rotor rotation rates, or adjusting or maintaining the rotor rotation rate by automatically controlling the tilt of the rotor disk relative to the airstream or aircraft, or a combination of these techniques. More specifically, by utilizing these techniques the forward aircraft speeds can be high enough, and the rotor rotation rates low enough, that an advance ratio, Mu, greater than 0.75 can be achieved while maintaining rotor stability.

BEST MODES FOR CARRYING OUT THE INVENTION

Figure 1:
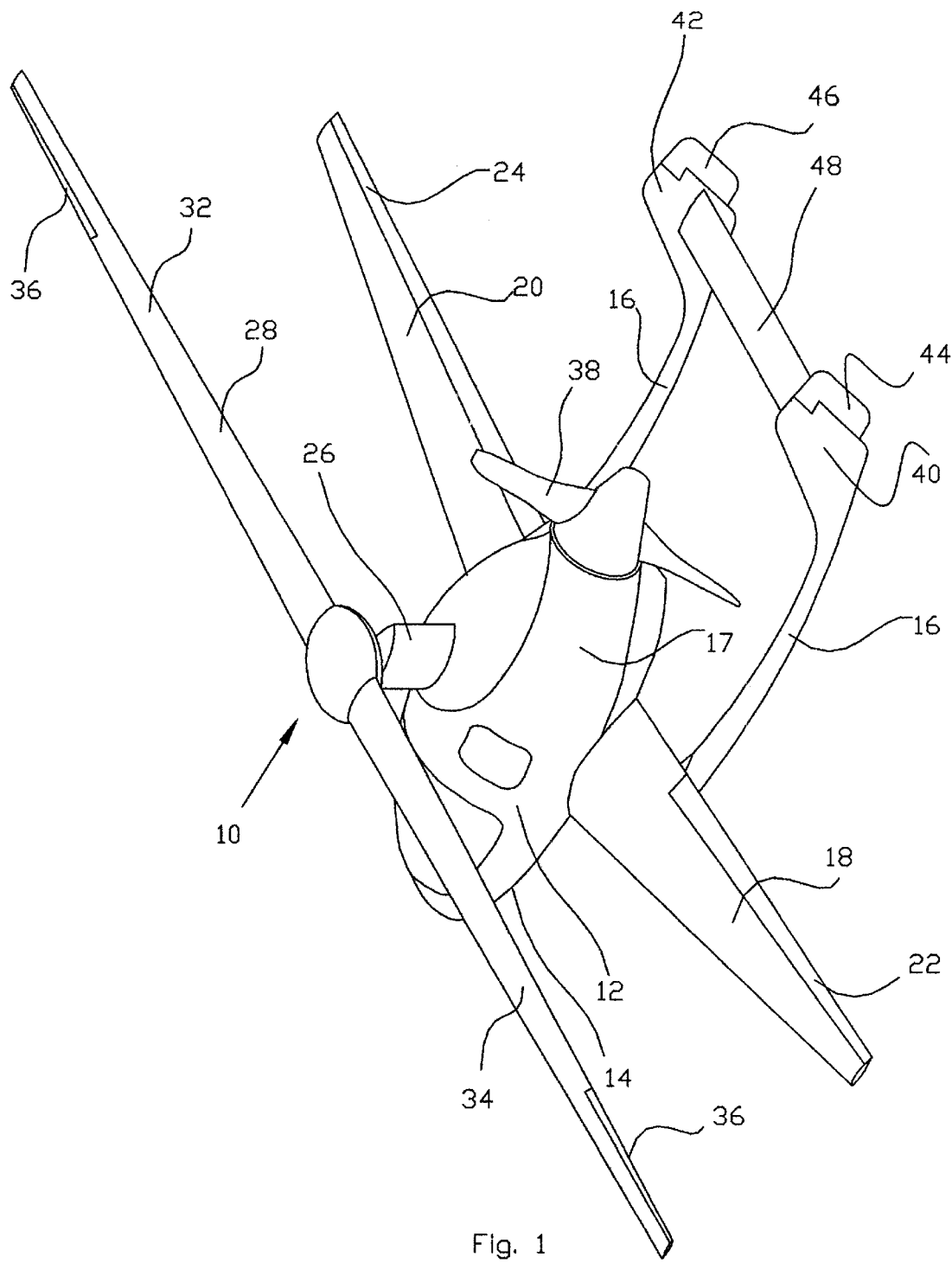
FIG. 1 is a perspective view of a high speed rotor aircraft constructed in accordance with this invention.

Referring to FIG. 1, a high speed rotor aircraft 10 of this invention is generally constructed with the technology disclosed in U.S. Pat. No. 5,727,754, although the concepts disclosed herein are applicable to all winged rotorcraft, including winged helicopters. Aircraft 10 includes a fuselage 12 having a forward portion 14, a rearward portion 17 and a tail 16. Fixed wings 18, 20 extend outward from fuselage 12, each having an aileron 22, 24 on a rearward edge. Ailerons 22, 24 are pivotally mounted at their front edge to wings 18, 20 such that their rear edge can be lifted out of the plane of wing 22, 24. Forward portion 14 encloses a cockpit (not shown) for a pilot and passengers or payload. A mast 26 with a tiltable spindle (not shown) extends upwardly from forward portion 14 behind the cockpit. The spindle of mast 26 supports a high inertia rotor 28 for rotation about mast 26. The spindle of mast 26 allows rotor 28 to tilt relative to fuselage 12 forward and rearward and side to side while rotating. Spindle of mast 26 also allows rotor 28 a given small angle of teeter from side to side. Rotor 28 has blades 30, 32 each having an adjustable angle of attack referenced as collective pitch and a weighted portion 34, 36 near their ends. A propeller 38 is mounted aft of the rearward portion 17 and faces rearward. An engine (not shown) mounted in rearward portion 17 drives propeller 38 and rotor 28. The engine is disengaged from rotor 28 during flight with a torque limiting clutch (not shown).

A pair of fins 40, 42 extend upward from tail 16. Each fin 40, 42 has a rudder 44, 46 on its rearward edge mounted to pivot out of the plane of fins 40, 42 A horizontal stabilizer 48 mounted with an adjustable angle of attack spans fins 40, 42.

The pilot can control various aspects of craft 10 including: forward to rearward tilt and side to side tilt of rotor 28; the relative angle of attack of rotor blades 30, 32 to the rotor plane of rotation or collective pitch; the relative horizontal angle of each aileron 22, 24 and horizontal stabilizer 48; and the relative vertical angle of rudders 44, 46. A mechanism, known to those skilled in the art, controls a "cyclic pitch" of blades 30, 32, which adjusts their angle of attack depending on the position of blade 30, 32 relative to the airflow.

In operation, rotor 28 is used for vertical and slow speed flight. However, unlike a conventional helicopter or autogyro which relies on only its rotor for lift, rotor 28 of craft 10 is essentially unloaded (very little lift) at high speed and wings 18, 20 provide the required lift. Rotor 28 can be slowed (to 125 rpm or less) during high speed flight to greatly reduce the drag of rotor 28 and enable craft 10 to reach higher speeds than those relying on the rotor alone for lift. This is discussed below in greater detail.

For jump take-off, aircraft 10 is positioned to cant slightly forward and rotor 28 is spun to a predetermined speed with the collective rotor pitch set at zero (zero lift). While rotor 28 is being powered, aircraft 10 is still on the ground, thus no tail rotor is required to counteract the torque going to rotor 28. When rotor 28 is up to speed and the pilot is ready for take off, the engine (not shown) is disengaged from rotor 28 and the pilot increases the collective rotor pitch. The combination of high rotor rpm and blade weight stores enough inertia energy to lift aircraft 10 forward and upward a safe height above the ground. Thrust from propeller 38 rapidly accelerates aircraft 10 at such a rate that as rotor 28 decelerates, rotor 28 is then tilted back allowing some air to flow upward through rotor 28 from its underside, thus driving rotor 28 to provide lift at low forward speed conditions. Because rotor 28 can provide lift at low forward speeds, wings 18, 20 can be sized much smaller than a comparable sized fixed wing aircraft, with a significant reduction in drag.

As wings 18, 20 begin to produce more lift, the lift from rotor 28 is reduced or unloaded. This is done by reducing the collective pitch of blades 30, 32 to zero, and by tilting rotor 28 forward. Airflow upward through rotor 28 causes it to rotate. The tilt of rotor 28 is then controlled to maintain the rate of rotation and rotor lift required. As the airspeed increases, wings 18, 20 provides more of the required lift. At some speed, wings 18, 20 could provide all of the lift, however, at no point during flight is rotor 28 stopped because rotor 28 would become unstable. While flying at this trim, aircraft 10 can reach higher speeds than conventional helicopters and autogyros because the drag on rotor 28 is greatly reduced as the rotational speed is reduced.

Figure 2:
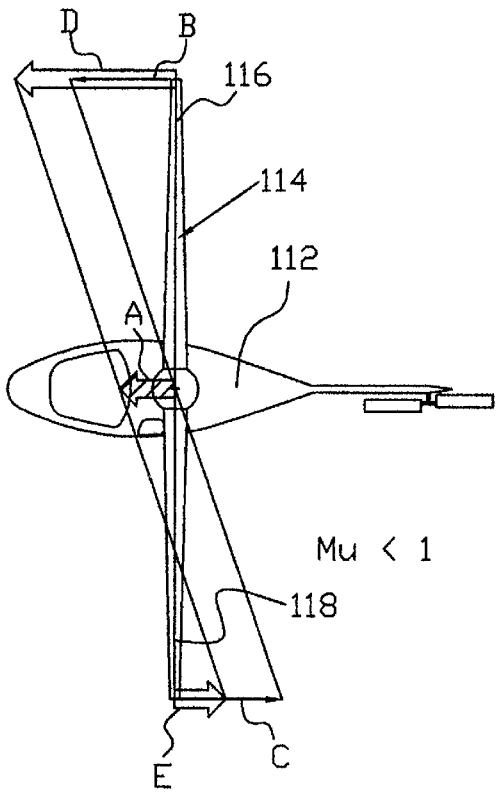
FIG. 2 is a schematic plan view of a prior art rotor aircraft with an advance ratio Mu less than 1.
Figure 3:
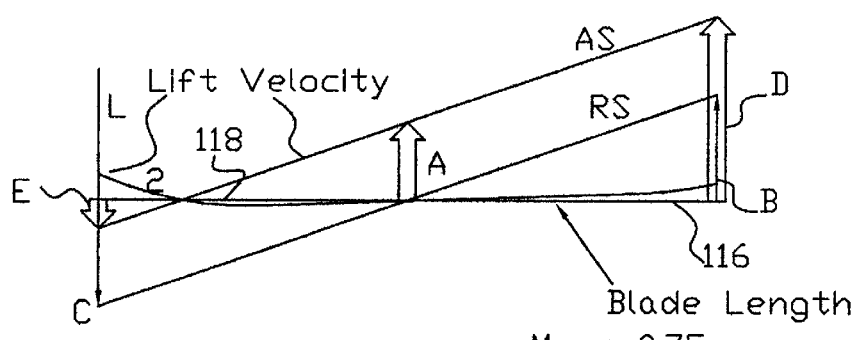
FIG. 3 is a vector diagram of rotor conditions at Mu equals 0.75, depicting rotor speed relative to the aircraft, airspeed over the rotor, and lift produced at points along the prior art rotor of FIG. 2.

FIG. 2 depicts a schematic of a conventional helicopter or autogyro in flight. To be stable, a conventional rotor aircraft 112 must maintain an advance ratio Mu much less than 1, where Mu is the ratio of aircraft speed, vector A, to rotor 114 tip speed relative to the aircraft, vector B, C. The airspeed of advancing blade 116 at its tip is the sum of vectors A and B represented by vector D. The airspeed of retreating blade 118 at its tip is the sum of vectors A and C, represented by vector E. If Mu is less than 1, the airspeed vector E at the blade tip of retreating blade 118 is positive. That is, the air flows over the leading edge of the retreating blade 118 first, a normal airflow direction. If Mu is equal to 1, then airspeed vector E is zero. In FIG. 3 line AS represents the airspeed relative to blades 116, 118 and line RS represents rotor speed relative to aircraft 10. The airspeed relative to blades 116, 118 is a function of Mu. At Mu less than 1 there is a point of zero airspeed Z on retreating blade 118. For example, at Mu equal to 0.75, the point of zero airspeed Z is at 75% of retreating blade 118 length. Airflow at the center of the rotor 114, and out to the zero airspeed point Z, is actually flowing backward, from the trailing edge to the leading edge, across retreating blade 118. Only 25% of retreating blade 118 has forward airflow, from its leading edge to its trailing edge.

The lift produced by each blade 116, 118 is a function of its angle of attack and airspeed, vectors D, E, squared. Each blade 116, 118 must produce an equal amount of lift moments for rotor 114 to be stable. The advancing airspeed vector D is always greater than retreating airspeed vector E. Thus the angle of attack of retreating blade 118 must be greater than that of advancing blade 116 to produce an equal amount of lift moments. This is further exacerbated by the fact that as Mu approaches 1, less and less of retreating blade 118 is producing lift, because less and less of retreating blade 118 has forward or positive airflow. Referring to FIG. 3, line L represents the relative lift produced at different points on rotor 28. At Mu equal to 0.75, only 25% of retreating blade 118 has forward airflow and is producing lift. If the aircraft speed A is increased and rotor speed is held constant, Mu increases and retreating blade 118 produces less lift for the same angle of attack.

To increase aircraft speed, the angle of attack of retreating blade 118 must be increased to compensate for the increased airspeed vector D and lift produced by advancing blade 116 and the reduced airspeed vector E. However, the angle of attack can only be increased until the retreating blade 118 begins to stall. Therefore, as Mu increases, airspeed vector E decreases, and retreating blade 118 cannot produce enough lift moments to counteract the lift moments produced by advancing blade 116. Pure helicopter and autogyros generally operate at a Mu less than ⅓. Thus, rotor aircraft 112 is unstable. To stabilize aircraft 112, rotor 114 speed must be increased, thus decreasing Mu. Therefore, as aircraft speed A increases, rotor speed B, C must increase to maintain the required lift moments on the retreating blade 118. At Mu equal to 1, retreating blade 118 cannot produce any lift regardless of its angle of attack because airspeed vector E is zero. Therefore it is impossible for a conventional helicopter or autogyro, which has to produce a significant amount of lift with its rotor, to achieve a Mu of 1.

The top speed of a rotor aircraft is limited by drag on the advancing blade 116 as it approaches the speed of sound. As the aircraft speed, vector A, increases, the value of vector D approaches the speed of sound and the aerodynamic drag on advancing blade 116 increases dramatically. Vector D reaches the speed of sound at a relatively low aircraft speed vector A, because vector D is the sum of aircraft speed vector A and advancing blade speed vector B. When vector D reaches the speed of sound the increased drag makes it impractical for aircraft 112 to travel any faster. Thus, the speed of a conventional rotor craft 112 is limited by the rotor speed B, C.

Figure 4:
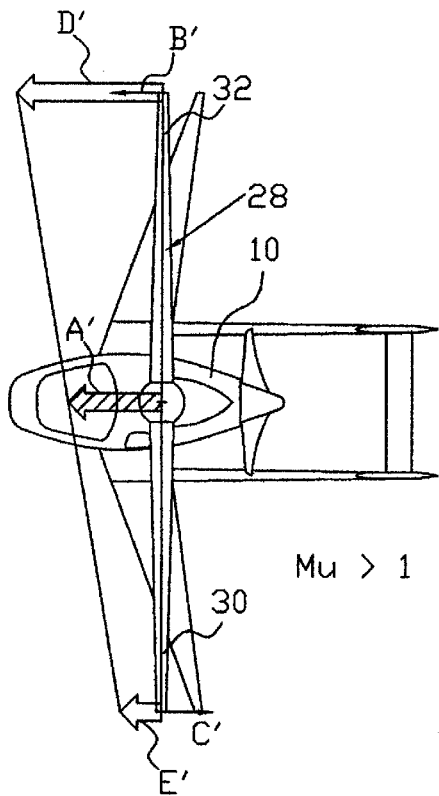
FIG. 4 is a schematic plan view of a high speed rotor aircraft constructed in accordance with this invention with an advance ratio Mu greater than 1.

Referring to FIG. 4, an aircraft 10 of this invention can be stable as Mu approaches and exceeds 1 because rotor 28 does not have to produce much lift or thrust during high speed flight. Thus, rotor 28 can be turned at a very low rate of speed (vectors B' and C' small) and maintained at a very shallow angle of attack required only to keep rotor 28 spinning at a high enough rotational speed to produce the blade centrifugal force necessary to keep it stiff and stable. Advancing blade 32 produces negligible lift and the retreating blade 30 can produce the same lift moment as the advancing blade 32 without having to increase the rotor speed to prevent stalling. That rotor 28 is not used for lift enables aircraft 10 to fly at Mu greater than 1 where the airflow is actually flowing in reverse over the entire retreating blade 30.

With a low rotor speed and high aircraft forward speed, the advancing blade 32 airspeed vector B' may be only marginally larger than the aircraft airspeed vector A'. The tip velocity B' of advancing blade 32 may be kept below the speed of sound, even at very high subsonic aircraft speed. For a jet powered version of aircraft 10 may have a forward speed A' of 500 mph and a blade 30 rotor tip speed B', C' of 100 mph, resulting in a Mu of 5. The tip airspeed D' of advancing blade 32 would be 600 mph. At 40,000 feet altitude, the speed of sound is approximately 660 mph, therefore the tip of advancing blade 32 would see a mach number of approximately 0.9 for a short duration of each blade revolution. Under these conditions of thin air, the short duration and the small blade area at the tip the incremental drag increase would be minimal.

For stability, the sum of the lift moments on the advancing blade 32 must equal the sum of the lift moments on the retreating blade 30. Instability may be caused by upward gusts which change the lift produced by each blade 30, 32. The lift produced by an airfoil such as blades 30, 32 equals one-half the product of the air density times the velocity squared times the lift coefficient times the area of the blade. The lift coefficient is a function of the angle of attack. Because blades 30, 32 differ in velocity, lift coefficient, and area along their lengths, the lift produced at each position along the length also varies. The lift moment is the lift at a particular point along the length times the distance to the center of rotor 28.

Figure 5:
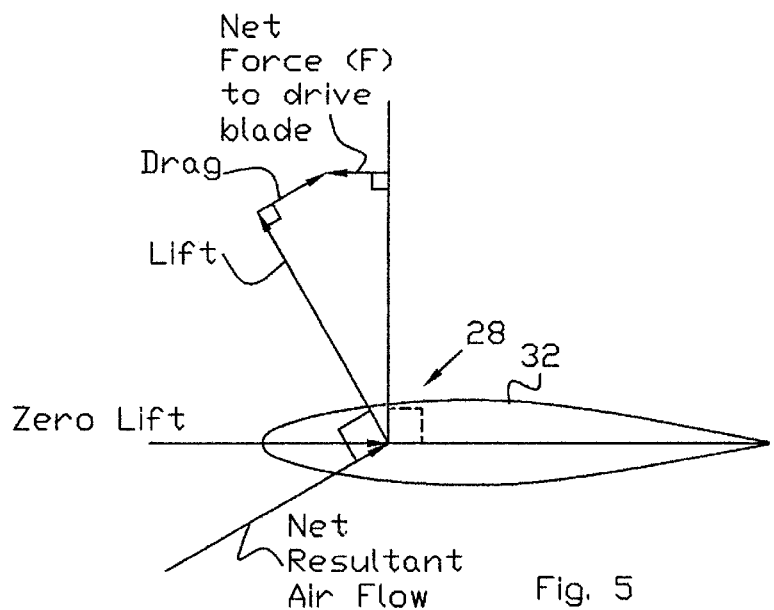
FIG. 5 is a schematic illustrating a blade subject to an upward gust.

FIG. 5 illustrates advancing blade 32 in cross-section at a zero collective pitch and during forward flight. Because rotor 28 will be tilted back slightly relative to the forward direction of the aircraft, the net resultant air flow will be flowing over blade 32 is at a low angle of attack. The airflow produces lift and drag. If the net force F is positive (left of vertical line), the rotational speed of rotor 28 will increase. If the angle of attack is reduced by decreasing the rearward tilt such that F is zero, then the rotational speed stays constant. If the angle of attack is further reduced such that F is negative, to the right of the vertical line, then the rotational speed of rotor 28 will decrease.

Figure 6:
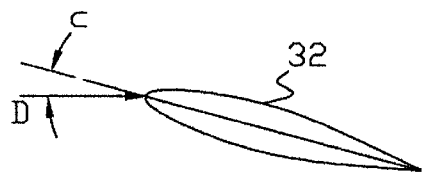
FIG. 6 is a schematic illustrating the advancing blade with a collective pitch angle c.
Figure 7:
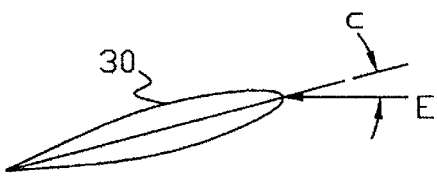
FIG. 7 is a schematic illustrating the retreating blade with a collective pitch angle c and an advance ration Mu less than 1.

FIGS. 6 and 7 illustrate, respectively, the advancing blade 32 and retreating blade 30 with collective pitch at an angle c applied and the Mu less than 1. Each blade 30, 32 has an inclination or angle of attack c relative to the plane of rotation, unlike FIG. 5. Because of the teetering spindle at mast 26 (FIG. 1), each blade 30, 32 is free to pivot upward and downward about mast 26, or flap relative to the other. The angle of attack for advancing blade 32 is the angle at which the blade strikes airstream D due to forward movement of the aircraft, the rotor tilt, collective pitch angle, blade flapping, and rotor rpm. Lift is produced along the lengths of blades 30, 32, but the lift differs at each point on retreating blade 30 from the corresponding point on advancing blade 32. The lift at each point differs because the net resultant airflow E over retreating blade 30 is at a lower velocity than advancing blade 32. Nevertheless, for stability, the sum of each lift moment on retreating blade 30 must equal the sum of each lift moment on advancing blade 30. This is handled by the ability of the blades 30, 32 to flap relative to one another.

The lift produced on advancing blade 32 causes it to tilt upward relative to mast 26 (FIG. 1). As advancing blade 32 pivots upward, its effective angle of attack decreases and the relative velocity of the airflow across blade 32 will begin to increase. At the same time, retreating blade 30 pivots downward, increasing its effective angle of attack, and increasing the velocity of the airflow across blade 30. The upward and downward pivoting of blades 30, 32 results in the lift moments of the advancing and retreating blades 32, 30 equaling each other.

Figure 8:
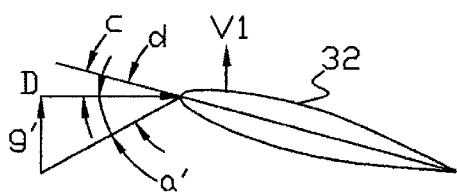
FIG. 8 is a schematic illustrating the advancing blade with a collective pitch angle c, subject to an upward gust.
Figure 9:
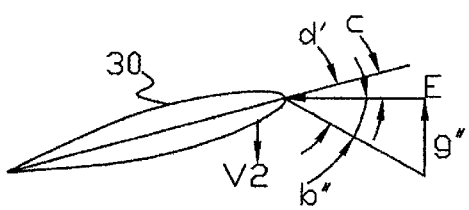
FIG. 9 is a schematic illustrating the retreating blade with a collective pitch angle c, an advance ratio Mu less than 1, and subject to an upward gust.

This concept may be better understood by referring to FIGS. 8 and 9, which illustrate advancing and retreating blades 32, 30 when undergoing an upward directed gust g. The apparent gust g' velocity equals the actual velocity of the gust g less the upward velocity V1 of blade 32. The apparent gust g' is at an angle a' relative to the plane of rotation. The apparent gust g' causes an effective greater angle of attack d than the angle of attack of collective pitch c, the angle d being between the plane of blade 32 and the resultant direction of the apparent gust g'. The angle d is the sum of angle a' plus angle c. The greater angle of attack d produces more lift.

In the same way, the effective angle of attack d' of retreating blade 30 is effectively increased by upward gust g which has an apparent angle of b" relative to the plane of rotation. The effective angle of attack d' of apparent gust g" equals the sum of collective angle c plus apparent gust angle b". However, because the airstream velocity E over the retreating blade 30 is less than velocity D over the advancing blade 32, retreating blade 30 will have a net downward velocity V2. Also, the net lift moments on the retreating blade 30 when the gust occurs are less than on the advancing blade 32. As the gust hits, advancing blade 32 can rise at a velocity V1 due to increased lift, but the apparent gust velocity g' decreases because it equals the actual gust velocity g less the upward velocity V1 that occurs due to increased lift. This decreases the effect of upward velocity V1. As advancing blade 32 rises, retreating blade 30 falls and effectively increases its speed V2 relative to the upward directed apparent gust g because these velocity components are in opposite directions. The decrease in relative gust speed g' of advancing blade 32 reduces its angle of attack and thus produces less lift. Similarly, the increase in relative gust speed g" of retreating blade 30 increases its angle of attack and produces more lift. The effect is that the lesser lift from advancing blade 32 and increase in lift from retreating blade 30 equalize the relative lift moments between blades 30 and 32, thus absorbing the gust. This flapping movement also occurs in the absence of gusts and occurs at Mu greater than 1 as well as less than 1.

Figure 10:
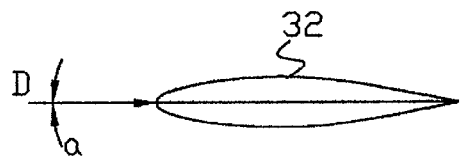
FIG. 10 is a schematic illustrating the advancing blade at zero collective pitch.
Figure 11:
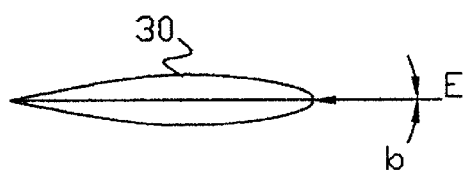
FIG. 11 is a schematic illustrating the retreating blade at zero collective pitch with an advance ratio Mu less than 1.

FIG. 10 and 11 show advancing blade 32 and retreating blade 30, respectively, at Mu less than 1, without collective pitch and without vertical gusts or flapping. This is the typical position of blades 32, 30 during high speed flight. The angles of attack a and b are near zero, but not precisely at zero because some rotation must occur. Some flapping will occur because of these angles of attack. As explained above, the velocities across the retreating blade 30 will be less than the advancing blade 32. This will result in advancing blade 32 pivoting upward and retreating blade 30 pivoting downward. The lift moments will equal as explained above.

Figure 12:
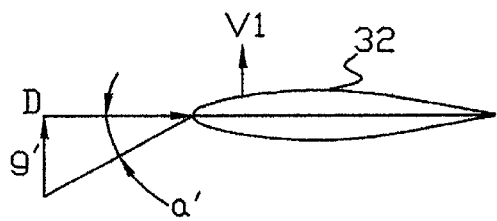
FIG. 12 is a schematic illustrating an advancing blade at zero collective pitch subject to an upward gust.
Figure 13:
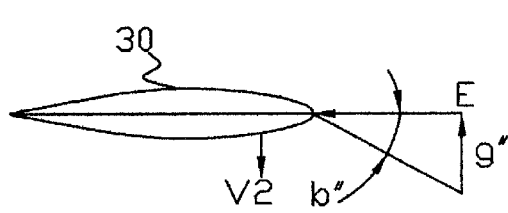
FIG. 13 is a schematic illustrating the retreating blade at zero collective pitch, with an advance ratio Mu less than 1, and subject to an upward gust.

FIGS. 12 and 13 show blades 32, 30 during high speed flight, but at a Mu less than 1, when encountering gusts. The collective pitch is zero. The discussion above in connection with FIGS. 8 and 9 also applies. Apparent gust g' from gust g strikes advancing blade 32 at an angle of attack a', increasing lift and causing an upward velocity component V1. Apparent gust g" strikes retreating blade 30 at an angle of attack b". Although this also increases lift, overall lift decreases because of the lower velocity E across retreating blade 30 than velocity D, causing it to drop at a velocity V2. As advancing blade 30 begins to pivot upward, the upward velocity component V1 of the advancing blade 32 relative to gust velocity g begins to decrease, decreasing lift and causing advancing blade 32 to begin pivoting back downward. As retreating blade 30 begins to pivot downward, its downward velocity component V2 begins to increase relative to gust velocity g, increasing lift and causing retreating blade 30 to begin pivoting back upward.

Figure 14:
FIG. 14 is a schematic illustrating the retreating blade at zero collective pitch with an advance ratio Mu greater than 1.
Figure 15:
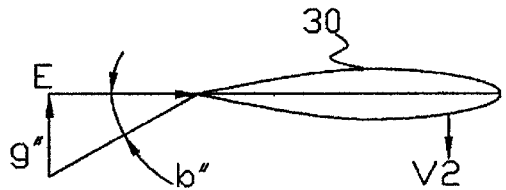
FIG. 15 is a schematic illustrating the retreating blade at zero collective pitch, with an advance ratio Mu greater than 1, and subject to an upward gust.

At a Mu greater than 1, advancing blade 32 will appear as in FIGS. 10 and 12 for no gust and gust conditions. Collective pitch is at zero in both cases of the advancing and retreating blades 32, 30. The discussion concerning FIGS. 10 and 12 also apply to Mu greater than 1 for advancing blade 32. However, retreating blade 30 will appear as in FIG. 14 for no gust conditions and as in FIG. 15 for gust conditions. The effective angle of attack is also near zero in FIG. 14, but it differs from FIG. 11 in that the airstream flows from the trailing edge 31 to the leading edge 33. A small amount of lift will be produced even though the airfoil shape is in reverse of ideal. If an upward gust g occurs with apparent velocity of g", the angle of attack b" increases from near zero. The lesser airstream velocity E being encountered on retreating blade 30 than velocity D on advancing blade 32, causes a decreasing lift and a downward velocity component V2. As retreating blade 30 pivots downward, its relative gust velocity increases. This increases lift and retreating blade 30 will begin to pivot back upward.

While the flapping described above will equalize the lift moments, thus maintaining craft stability, flapping can also cause rotor instability if left unchecked. Controlled use of negative collective can decrease flapping and reduce drag when Mu is greater than 0.75.

Collective pitch is defined by the angle of the blade 30,32 relative to the rotor plane of rotation A. If there is zero collective pitch both the leading edge 33 and the trailing edge 31 travel in the plane of rotation A. When there is positive collective pitch the leading edge 33 will be above the plane of rotation A and the trailing edge 31 will be below the plane of rotation A. Negative collective pitch is defined by the leading edge 33 being below the plane of rotation A and the trailing edge 31 being above the plane of rotation A. If the aircraft 10 or 112 is experiencing little or no forward motion, zero collective provides zero lift, positive collective provides positive lift and negative collective provides negative lift. At low speeds, negative lift translates into the aircraft 10 or 112 being pushed down by the blade 28 or 114. Therefore, typical rotorcrafts 112 have no means for inducing negative collective.

Figure 16:
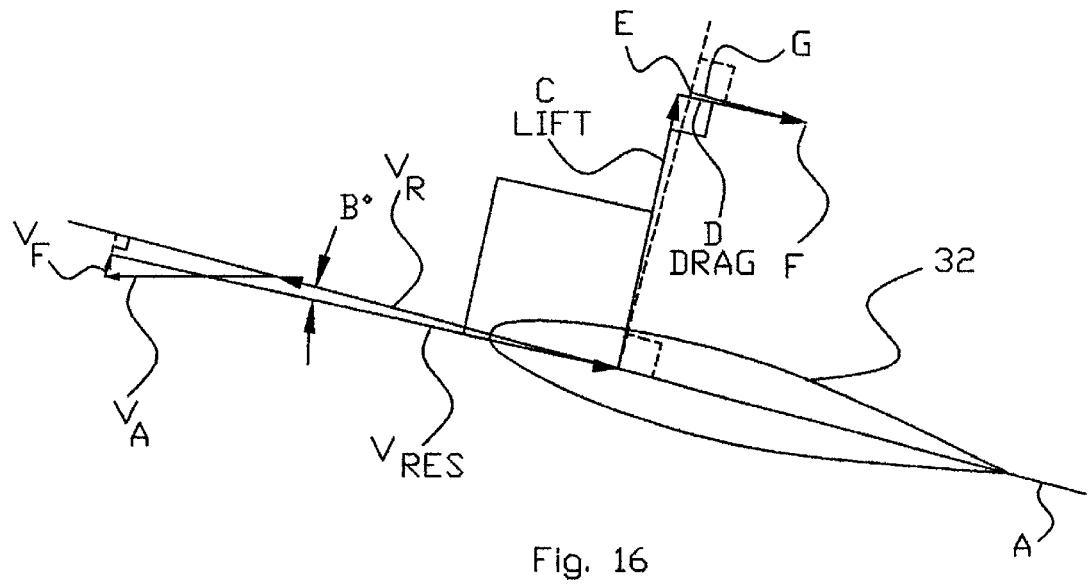
FIG. 16 is a schematic illustrating the advancing blade at zero collective pitch.
Figure 17:
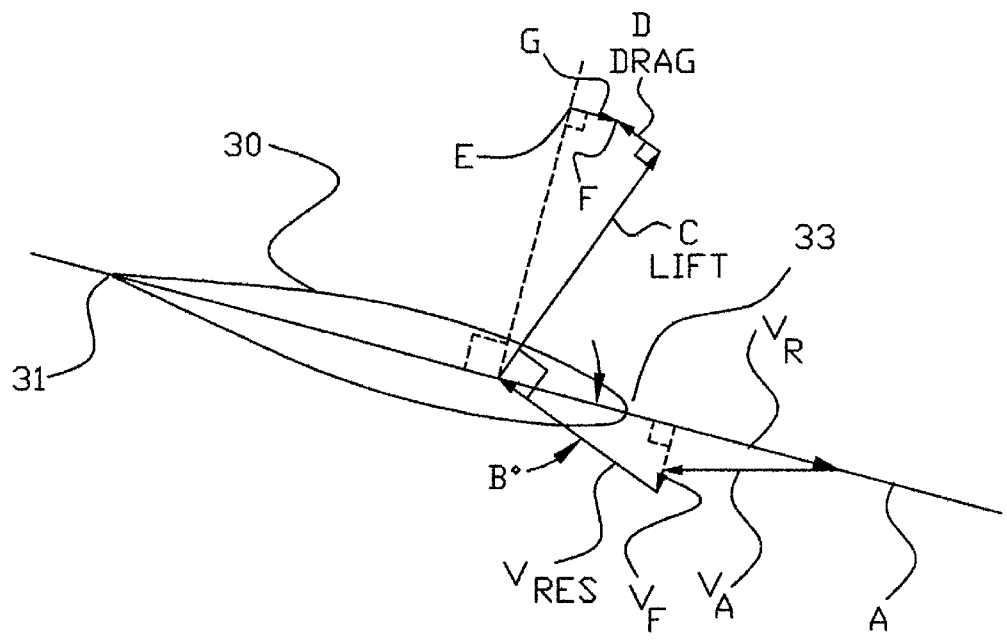
FIG. 17 is a schematic illustrating the retreating blade at zero collective pitch with forward flow.
Figure 18:
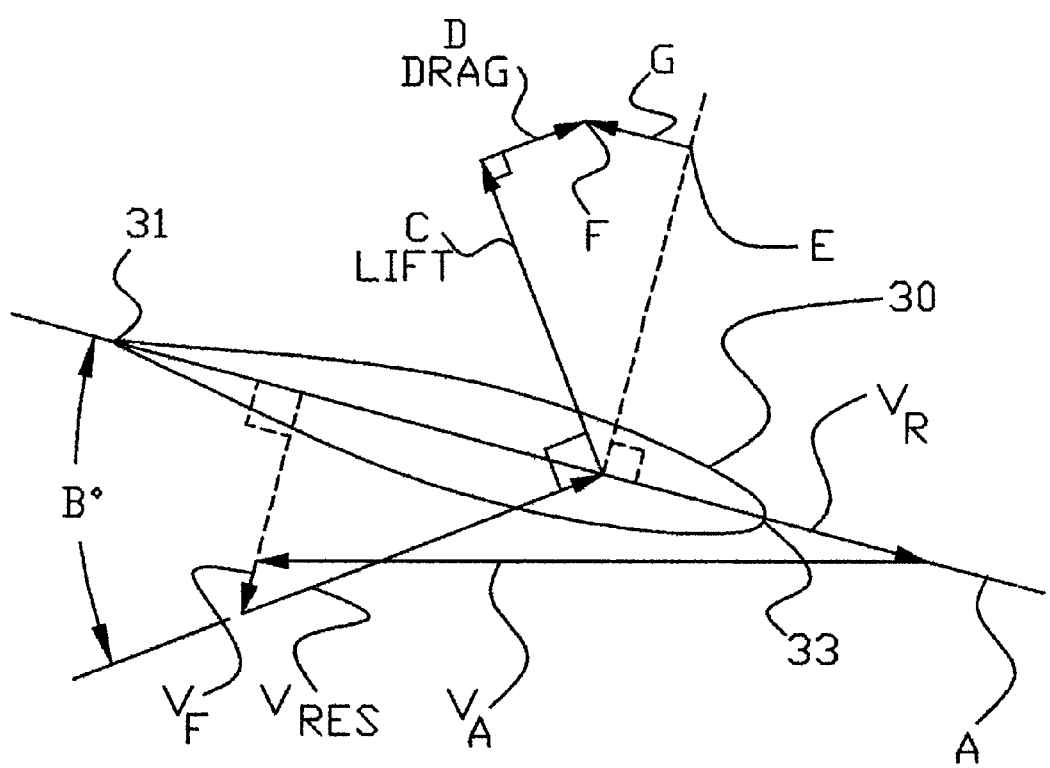
FIG. 18 is a schematic illustrating the retreating blade at zero collective pitch with reverse flow.

FIGS. 16 through 18 and their accompanying discussion illustrate how a rotor can equalize lift between the advancing and retreating blades, and also illustrates how to calculate when autorotation will occur. In FIGS. 16 through 18, line A represents the rotor plane of rotation, which is tilted as it must be for an autogyro traveling toward the left, although the tilt is greatly exaggerated. Advancing blade 32 is operating at a collective pitch of zero degrees relative to the rotor plane of rotation A. Vector Vr represents the rotational speed of this section, and is along the plane of rotation. Vector Va represents the forward speed of the aircraft, and is horizontal. Vector Vf represents the movement of this section perpendicular to the plane of rotation due to flapping. The sum of vectors Vr, Va, and Vf results in vector Vres, which is the resultant velocity of the air as it impinges on this section.

In general, lift equalization occurs because of flapping. Flapping is the upward movement of advancing blade 32, reducing its angle of attack and lift, and simultaneous downward movement of retreating blade 30, increasing its angle of attack and lift.

FIG. 16 shows a cross section of advancing blade 32 near the tip, and is illustrative of the conditions for any section of the advancing blade at any Mu. The angle of attack B of this section is the angle between vector Vres and the plane of rotation A. Note that the addition of flapping vector Vf results in a smaller angle of attack B than would otherwise be present, which results in less lift for this section. Therefore, flapping has reduced the lift of this section. Similarly, if collective were negative, the airfoil would be tilted further counterclockwise which would also result in a smaller angle of attack B and would reduce flapping.

Lift is always defined to be perpendicular to the airflow, and drag is parallel to airflow. Still referring to FIG. 16, vector C (perpendicular to vector Vres) represents the lift of advancing blade 32 and vector D (parallel to Vres) represents the drag of that section. The component of the lift and drag in the plane of rotation is represented by vector G that extends between points E and F. Since vector G points opposite to the direction of rotation, it is shown as a resisting force and will act to slow autorotation. However, the actual lift to drag ratio of the airfoil and the angle of attack B determine whether the force is driving or resisting. Mathematically, if the angle of attack B is greater than the arctangent of the quantity of drag D divided by lift C, then this section will provide a driving force. Negative collective would reduce the resisting force in this example.

FIG. 17 shows a cross section of the retreating blade 30 under conditions where flow over the blade is in the normal direction, from the leading edge to the trailing edge. This condition will occur near the retreating blade tip when Mu is much less than 1. The angle of attack B of this section is the angle between vector Vres and the plane of rotation A. Note that the addition of flapping vector Vf results in a larger angle of attack B than would otherwise be present, which results in more lift for this section (unless it is already stalled). Therefore, flapping generally increases the lift of this section. Negative collective would not be used in this condition because forward flow on the retreating blade 30 would only occur at low airspeeds; it would also not decrease flapping.

Still referring to FIG. 17, lift C acts perpendicular to vector Vres (the oncoming air), and drag D acts parallel to it. Therefore, the force in the plane of rotation due to lift and drag is vector G. Vector G acts in the direction of rotation, so it is a driving force. However, depending on the ratio of lift to drag and on the angle of attack, the actual force may be driving or resisting. Again, if the angle of attack B is greater than the arctangent of the quantity of drag D divided by lift C, then this section will provide a driving force.

FIG. 18 shows a cross section of the retreating blade 30 under conditions where flow over the blade is in the reverse direction, from the trailing edge 31 to the leading edge 33. This condition will occur near the retreating blade 30 root at any Mu, and propagate toward the tip as the Mu increases, until it exists on the entire retreating blade 30 at a Mu greater than 1. Since the flow is generally from the trailing edge 31 to the leading edge 33, the airfoil will operate inefficiently but will still provide some lift. The angle of attack B is the angle between vector Vres and plane of rotation A. Note that the addition of flapping vector Vf still increases angle of attack B and therefore tends to increase lift. Negative collective would turn the airfoil clockwise and increase its angle of attack, thereby increasing lift and decreasing flapping.

Still referring to FIG. 18, lift C acts perpendicular to vector Vres (the oncoming air), and drag D acts parallel to it. Therefore, the force in the plane of rotation due to lift and drag is vector G. Vector G acts opposite to rotation, so it is a resisting force. However, depending on the ratio of lift to drag and on the angle of attack, the actual force may be driving or resisting. Unlike in FIGS. 16 and 17, in FIG. 18, if the angle of attack B is less than the arctangent of the quantity of drag D divided by lift C, then this section will provide a driving force. Since the drag of the airfoil operating in reverse is generally high, angle of attack B can generally be relatively high and still result in a driving force. Negative collective would reduce the resisting force or increase the driving force.

The invention is not limited to the preferred embodiments described above; on the contrary the invention extends to any variant that reproduces the above-described essential characteristics by equivalent means.

I claim:

1. A method for controlling an aircraft during horizontal flight, the aircraft having a fuselage, wings attached to the fuselage, a rotor mounted to the fuselage for rotation in a plane of rotation, the rotor comprising at least two blades, each blade having a tip, and a power source that delivers forward thrust for horizontal flight, comprising:

providing sufficient thrust from the power source to cause airflow over the wings to provide forward horizontal flight at a desired velocity, the wings being sized to provide enough lift to sustain the horizontal flight;

tilting the plane of rotor rotation aft sufficiently relative to the fuselage to cause airflow through the blades due to the horizontal flight to rotate the blades, defining an advancing blade and a retreating blade relative to direction of the horizontal flight;

applying a substantially zero collective pitch to the rotor; and with each rotation, allowing the advancing blade to rise and the retreating blade to fall simultaneously relative to the aircraft, thereby decreasing a relative air angle of attack of the advancing blade to reduce lift and increasing a relative air angle of attack of the retreating blade to increase lift, so that essentially a sum of the lift moments of the advancing blade equals a sum of the lift moments of the retreating blade.

2. The method according to claim 1, wherein the velocity of the fuselage is greater than the velocity at the tip of the retreating blade, resulting in reverse airflow over the entire retreating blade.

3. The method according to claim 1, wherein substantially zero collective pitch comprises a slightly negative collective pitch.

4. A method for controlling an aircraft during horizontal flight, the aircraft having a fuselage, wings attached to the fuselage, a rotor mounted to the fuselage for rotation in a plane of rotation, the rotor comprising at least two blades, each blade having a tip, and a power source that delivers forward thrust for horizontal flight, comprising:

providing sufficient thrust from the power source to cause airflow over the wings to provide forward horizontal flight at a desired velocity, the wings being sized to provide enough lift to sustain the horizontal flight;

reducing positive collective pitch to no more than approximately zero;

tilting the rotor plane of rotation aft sufficiently relative to the fuselage to cause airflow through the blades due to the horizontal flight to rotate the blades, defining an advancing blade and a retreating blade relative to direction of the horizontal flight;

controlling the tilt and rotational speed of the blades so that a sum of the tip velocity of the advancing blade plus the velocity of the fuselage is less than a speed of sound and such that the velocity of the fuselage is greater than the velocity at the tip of the retreating blade, resulting in reverse airflow over the entire retreating blade.

5. The method according to claim 4, wherein a negative collective pitch is applied to the advancing and retreating blades.

6. A method for controlling an aircraft during horizontal flight, the aircraft having a fuselage, wings attached to the fuselage, a rotor mounted to the fuselage for rotation in a plane of rotation, the rotor comprising at least two blades, each blade having a tip, and a power source that delivers forward thrust for horizontal flight, comprising:

providing sufficient thrust from the power source to cause airflow over the wings to provide forward horizontal flight at a desired velocity, the wings being sized to provide enough lift to sustain the horizontal flight;

inducing a slight negative collective pitch to the blades, tilting the rotor plane of rotation aft relative to the fuselage sufficiently to cause airflow through the blades due to the horizontal flight to rotate the blades, defining an advancing blade and a retreating blade relative to direction of the horizontal flight; and controlling the tilt so that a sum of a tip velocity of the advancing blade plus the velocity of the fuselage is less than a speed of sound and reverse airflow exists over the entire retreating blade.

7. The method according to claim 6, further comprising:

with each rotation, allowing the advancing blade to rise and the retreating blade to fall simultaneously relative to the aircraft, thereby decreasing a relative air angle of attack of the advancing blade to reduce lift and increasing a relative air angle of attack of the retreating blade to increase lift, so that a sum of the lift moments of the advancing blade equals a sum of the lift moments of the retreating blade.

* * * * *